United States Patent [19]

Leys

[11] Patent Number: 5,346,640

[45] Date of Patent: Sep. 13, 1994

[54] CLEANER COMPOSITIONS FOR REMOVING GRAFFITI FROM SURFACES

[75] Inventor: Cassius W. Leys, Hartsdale, N.Y.

[73] Assignee: Transcontinental Marketing Group, Inc., Windham, N.Y.

[21] Appl. No.: 850,396

[22] Filed: Mar. 11, 1992

Related U.S. Application Data

[63] Continuation-in-part of Ser. No. 694,463, May 1, 1991, abandoned, which is a continuation of Ser. No. 400,564, Aug. 30, 1989, Pat. No. 5,024,780, and a continuation-in-part of Ser. No. 423,258, Oct. 18, 1989, abandoned.

[51] Int. Cl.$^5$ .................. C09D 9/00; C11D 7/22; C11D 7/50
[52] U.S. Cl. .................. 252/162; 252/170; 252/153; 252/542; 252/DIG. 8; 134/38
[58] Field of Search .......... 252/162, 170, 171, 172, 252/364, 153, 542, DIG. 8; 134/38

[56] References Cited

U.S. PATENT DOCUMENTS

| | | | |
|---|---|---|---|
| 3,954,648 | 5/1976 | Belcak et al. | 252/171 |
| 4,304,681 | 12/1981 | Martin et al. | 252/171 |
| 4,311,618 | 1/1982 | Schäfer-Burkhard | 252/153 |
| 4,508,634 | 4/1985 | Elepano et al. | 252/163 |
| 4,617,251 | 10/1986 | Sizensky | 252/162 |
| 4,664,721 | 5/1987 | Valasek | 134/38 |
| 4,729,797 | 3/1988 | Linde et al. | 252/171 |
| 4,780,235 | 10/1988 | Jackson | 252/171 |
| 4,836,950 | 6/1989 | Madsen et al. | 252/170 |
| 5,024,780 | 6/1991 | Leys | 134/38 |

*Primary Examiner*—Prince Willis, Jr.
*Assistant Examiner*—J. Silbermann
*Attorney, Agent, or Firm*—Ohlandt, Greeley & Ruggiero

[57] ABSTRACT

A cleaner composition for removing graffiti including ink, marking pen marks and paint from a variety of substrates or surfaces. The base composition for all five embodiments comprises N-methylpyrrolidone, propylene carbonate, isocetyl alcohol, an ingredient selected from the group consisting of dipropylene glycol monomethyl ether acetate and dipropylene glycol methyl ether acetate, a thickening agent and a surfactant. Each species or embodiment varies the range of these ingredients and some embodiments include other ingredients, such as dimethyl sulfoxide, a tertiary amine and mineral oil and lavender oil. Each embodiment is directed to a different type substrate or surface to maximize the removal of graffiti on that surface without any deleterious effects to that surface.

18 Claims, No Drawings

CLEANER COMPOSITIONS FOR REMOVING GRAFFITI FROM SURFACES

This is a continuation-in-part of copending application(s) Ser. No. 07/694,463 filed on May 1, 1992, now abandoned, which in turn is a continuation of application Ser. No. 07/400,564, filed Aug. 30, 1989, now U.S. Pat. No. 5,024,780, which issued Jun. 18, 1991; and the present application is also a continuation-in-part of application Ser. No. 07/423,258, filed Oct. 18, 1989 now abandoned.

BACKGROUND OF THE INVENTION

1. Field of the Invention

The present invention relates generally to cleaner compositions. More particularly, the present invention relates to such cleaner compositions that remove graffiti including conventional graffiti, such as oil based paints including enamels, epoxies, lacquers and urethanes, ink, marking pen marks, paint, lipstick, shoe polish and nail polish from a variety of surfaces without damage to the protective coat on the surface and without altering the surface or causing damage to any area in close proximity thereto. Also, the present invention relates to cleaner compositions that have very low evaporation rate and very high flash point.

The present invention includes five particular cleaner compositions each for different kinds of surface. Each of the five compositions include certain active ingredients and additives, however the range of the active ingredients and the use of additional ingredients varies in each composition.

In recent years, there has been an increase concern over the rapidly growing problem of graffiti. In modern times, the term graffiti has come to acquire a meaning that differs substantially from it's historical meaning. Specifically, the modern observer views graffiti not as an art form, but rather, as a form of destruction and vandalism.

The application of graffiti has become most prevalent in institutions, such as, schools, school buses, public and private buildings, automobiles, trucks, trains, cars and rest rooms that are available to the public at large. Graffiti is even more problematic in open areas, such as, support walls and piers, bridges, retaining walls, sound barriers, the exterior walls of buildings and various structures in parks, which incidentally were put there in the first place to cosmetically improve the parks and the like.

The methods for the removal of graffiti, that for the most part are cost prohibitive, have included, sandblasting, hydrosanding and hydroblasting the surfaces on which the graffiti appears. These methods often involve a subsequent re-painting of the surface to restore its aesthetically pleasing appearance since sandblasting, hydrosanding and hydroblasting make a surface porous and rough. Depending on the nature of the surface, such methods could have a potentially deleterious effect to the surface. For example, such methods can etch or score the surface thereby creating a degree of porosity that assists in holding later applied graffiti to the surface, as well as to any area in close proximity. Also, sandblasting will emit potentially carcinogenic and siliceous particles into the air. Moreover, such methods can not be used for polycarbonate, acrylic, plexiglass, glass and certain plastic surfaces.

Another method for removing graffiti includes chemical removal, such as acids and caustic solutions, to treat the surface on which the graffiti appears. This method has proven costly and unsuccessful. It has been found that repeated chemical cleaning quickly destroys the painted surface, necessitating frequent repainting. The application of such strong chemical cleanets also have a deleterious effect to the surrounding environment and on the person applying the chemicals. Further, chemical treatment is also not effective on polycarbonate, acrylic, plexiglass, glass and certain plastic surfaces since etching, fogging and melting will occur on such surfaces. Still further, some of the chemicals are now either banned as pollutants to the environment or, perhaps, in the process of being banned.

Perhaps the most common way of removing graffiti is to repaint the surface. As can be appreciated, this approach is perhaps the least effective. It requires the use of a paint that is capable of covering and masking the graffiti without the graffiti pigment colors bleeding through the overcoat during the relatively short period of time it takes the overcoat to set up or dry. Obviously, repainting of a surface is costly and, moreover, painting most often will obliterate the desired surface finish of many surfaces such as polycarbonate, acrylic, plexiglass and glass surfaces.

2. Description of the Prior Art

U.S. Pat. No. 4,716,056 to Frank Fox and Cassius Leys, an inventor of the present invention, issued on Dec. 29, 1987 and is titled: a System for Treating a Surface. It provides a system having a composition that treats a surface to render it substantially resistant to subsequent markings and to permit it to be readily and inexpensively cleaned using a particular cleaning composition without altering the surface or causing damage to any area in close proximity thereto. These non-toxic cleaners are particularly adaptable for the removal of graffiti therefrom. The particularly preferred cleaning composition set forth in this patent comprises 28% toluene, 10% methyl ethyl ketone, 13% xylene, 2% ethylene glycol n-butyl ether, 10% methylene chloride, 15% propane, 15% isopropanol, 2% methanol and 5% o-dichlorobenzene.

Further, methylene chloride lifts the paint off in large scabs instead of emulsifying the paint into a water soluble emulsion, and it leaves a residue on the surface to be cleaned. The drawbacks of this formula is that the methylene chloride has been banned in many states due to its toxicity, has been classified as a toxic and hazardous chemical by the Occupational Safety and Health Administration (O.S.H.A.) and the Environmental Protection Agency (E.P.A.), and is currently, and is currently the subject of proposals for the almost complete ban of the chemical from further use in the environment.

Priority U.S. application Ser. No. 07/423,258 which was filed Oct. 18, 1989 and its parent U.S. application Ser. No. 07/400,564, which was filed on Aug. 30, 1989, now U.S. Pat. No. 5,024,780, which issued on Jun. 18, 1991, are directed to a Cleaner for Treating a Surface. This patent is by Cassius Leys, the inventor of the present application. It provides a cleaner composition which comprises propylene carbonate, N-methylpyrrolidone, a hydroxypropyl cellulose thickening agent, an active ingredient selected from the group consisting of glycols and isocetyl alcohol and a surfactant. It does not provide for the use of dimethyl sulfoxide. While this cleaner composition is used to remove graffiti, paint and other coatings from many surfaces, it is not suited to remove graffiti on numerous plastic, coated polycarbonate, acrylic, plexiglass and glass surfaces as it attacks, melts or fogs and crazes these surfaces.

Priority U.S. application Ser. No. 07/423,258, which was filed on Oct. 18, 1989, is directed to a Cleaner for Treating Certain Surfaces. The application is by Cassius Leys, the inventor of the present application, and provides a cleaner composition for cleaning plexiglass by removing graffiti from a surface made of coated polycarbonate, acrylic, plexiglass, glass or certain plastics or a combination thereof. The cleaner comprises propylene carbonate in an amount between about 45 to about 55 parts; isocetyl alcohol in an amount between about 16 to about 22 parts; N-methylpyrrolidone in an amount between about 16 to about 22 parts; a proprietary additive in an amount between about 1 to about 3 parts; and, an ingredient selected from the group consisting of dipropylene glycol monomethyl ether acetate, dipropylene glycol methyl ether, diethylene glycol monoethyl ether acetate and diethylene glycol monoethyl ether, in an amount between about 8 to about 12 parts. It has now been found that while this composition performs, it does not perform as well as the plexiglass cleaner composition of the present application. This is believed due to the different ingredients and the different range of the common ingredients in each composition.

Other cleaners, such as AGP Wipe-Away by the assignee of the present application, remove graffiti, but do not act as effectively and with the desired very low evaporation rate and non-flammability features.

SUMMARY OF THE INVENTION

Against the foregoing background, it is a primary object of the present invention to provide cleaner compositions for removing graffiti including conventional graffiti, ink, marking pen marks, paint, lipstick, shoe polish and nail polish from surfaces.

It is another object of the present invention to provide such compositions for treating all types of surfaces whether or not the surface is protected with an antigraffiti coating or paint.

It is yet another object of the present invention to provide such compositions that are water soluble, biodegradable and virtually non-toxic, and have very low evaporation rate and non-flammability features.

It is still another object of the present invention to provide such compositions that are environmentally and worker safe.

It is still yet another object of the present invention to provide a general graffiti cleaner composition and a paint remover composition that require just one application to remove the undesired graffiti, and which, after use, can be completely neutralized and washed off with water.

It is yet still another object of the present invention to provide such compositions that leave behind virtually no residue.

It is yet still another object of the present invention to provide such compositions that can be applied by brush, roller, spray or cloth and can be used on a multitude of surfaces.

To the accomplishments of the foregoing objects and advantages, the present invention, in brief summary, includes a basic cleaner composition for treating a surface, that comprises N-methylpyrrolidone, propylene carbonate, isocetyl alcohol, dipropylene glycol methyl ether acetate or dipropylene glycol monomethyl ether acetate, a thickening agent and a surfactant.

A first specie cleaner composition is used to remove graffiti from coated or non-porous surfaces, such as, for example, baked or high gloss enamel, polished or glazed surfaces, masonry, namely, cement and concrete, brick, tile and the like; stone and polished stone; metals including aluminum and steel; smooth or polished wood. This general graffiti composition includes N-methylpyrrolidone in an amount between about 32 to about 40 percent, propylene carbonate in an amount between about 15 to about 25 percent, dipropylene glycol methyl ether acetate or dipropylene glycol monomethyl ether acetate in an amount between about 15 to about 25 percent and isocetyl alcohol in an amount between about 15 to about 25 percent.

The general graffiti composition also includes dimethyl sulfoxide in an amount between about 4 to about 8 percent, a thickening agent, preferably cellulose, 2-hydroxypropyl ether or hydroxypropyl ether of cellulose, in an amount between about 2 to about 3 percent and a surfactant, preferably poly(oxy-1,2-ethanediyl)-alpha(nonylphenyl)omega-hydroxy, in an amount between about 1 to about 3 percent, by volume of the total composition.

A second specie cleaner composition is a heavy duty graffiti composition that is used to remove a large number of layers of graffiti and or any underlying paint from uncoated or porous surfaces, such as, for example, masonry, namely, cement, cement blocks, concrete, brick, mortar, tile and the like; stone; metal including aluminum and steel; plaster board and wood and, in addition, certain magic marker stains and high gloss hard enamel surfaces. The heavy duty graffiti composition includes N-methylpyrrolidone in an amount between about 40 to about 60 percent, propylene carbonate in an amount between about 10 to about 20 percent, dipropylene glycol methyl ether acetate or dipropylene glycol monomethyl ether acetate in an amount between about 3 to about 7 percent, isocetyl alcohol in an amount between about 7.5 to about 14 percent, dimethyl sulfoxide in an amount between about 7.5 to about 14 percent, the thickening agent in an amount between about 2.3 to about 3.5 percent and the surfactant in an amount between about 1 to about 3 percent, by volume of the total composition.

A third specie cleaner composition is a paint remover emulsifier or composition. It is used to remove heavy, old graffiti and underlying paint from all surfaces except plastic. The remover composition includes N-methylpyrrolidone in an amount between about 40 to about 60 percent, propylene carbonate in an amount between about 5 to about 20 percent, dipropylene glycol methyl ether acetate or dipropylene glycol monomethyl ether acetate in an amount between about 2 to about 6 percent, isocetyl alcohol in an amount between about 7.5 to about 14 percent, dimethyl sulfoxide in an amount between about 10 to about 30 percent, the thickening agent in an amount between about 1 to about 3 percent and the surfactant in an amount between about 1 to about 3 percent, by volume of the total composition.

A fourth specie cleaner composition is a pair of plexiglass graffiti compositions. These compositions are used to remove graffiti from methyacrylate, methyl methacrylate, coated or scratch resistant polycarbonate, polyvinyl chloride compounds (hard vinyl compounds), melamine plastics, acrylic, plexiglass and glass surfaces. Both plexiglass cleaner compositions include N-methylpyrrolidone in an amount between about 10 to about 20 percent, propylene carbonate in an amount between about 45 to about 55 percent, dipropylene glycol methyl ether acetate or dipropylene glycol monomethyl ether acetate in an amount between about 10 to about 20 percent, isocetyl alcohol in an amount between about 10 to about 20 percent, the thickening agent in an amount between about 1 to about 3 percent and the surfactant in an amount between about 1 to about 3 percent. One of the plexiglass cleaner compositions also includes a tertiary amine in an amount up to 1.4 percent by volume of the total composition.

A fifth specie cleaner composition is a vinyl cleaner composition. The vinyl cleaner composition is used to remove graffiti from all soft vinyl surfaces, such as seat covers, cushions and padded surfaces. The vinyl composition is a two part composition. The first part, which is about seventy six percent of the total vinyl cleaner composition, includes N-methylpyrrolidone in an amount between about 10 to about 14 percent, propylene carbonate in an amount between about 50 to about 60 percent, dipropylene glycol methyl ether acetate or dipropylene glycol monomethyl ether acetate in an amount between about 10 to about 15 percent, isocetyl alcohol in an amount between about 10 to about 18 percent, the thickening agent in an amount between about 1 to about 2 percent and the surfactant in an amount between about 0.5 to about 1.5 percent, by volume of the total composition. The second part, which comprises about twenty four percent of the vinyl cleaner composition, includes lavender oil and mineral oil. The second part serves to protect the soft vinyl from the effects of the solvents in part one of this cleaner composition. Accordingly, the solvents of the first part remove the graffiti, while the oils of the second part prevent any adverse effects on the soft vinyl surface by the solvents of this cleaner composition.

DESCRIPTION OF THE PREFERRED EMBODIMENTS

The cleaner compositions of the present invention are directed to removing graffiti from a surface and for treating that surface so as to make it easy to remove subsequently applied graffiti. In this application, graffiti means conventional graffiti, such as oil based paints including enamels, epoxies, lacquers and urethanes; ink; marking pen marks; paint; lipstick; shoe polish; nail polish and the like.

The cleaner compositions of the present invention are five specific cleaner compositions each one particularly suited to remove graffiti from specific, but different, surfaces. All five cleaner compositions have a plurality of common or stem ingredients, but in varying, specific ranges. Each composition has additional, other ingredients.

Because of the variety of graffiti types and the variety of substrates or surfaces, no one specie composition is effective to remove all types of graffiti on all types of surfaces. While the basic or stem composition is effective, to maximize effectiveness the five embodiments or specie cleaner compositions have been developed for specific surfaces.

The five specie compositions are: (1) a general graffiti cleaner composition that is adapted to remove graffiti from coated or non-porous surfaces, such as, for example, baked or high gloss enamel, polished or glazed surfaces, masonry, namely, cement and concrete, brick, tile and the like; stone and polished stone; metals including aluminum and steel; smooth or polished wood; (2) a heavy duty graffiti cleaner composition that is adapted to remove graffiti from uncoated (non-coated) or porous surfaces, such as, for example, masonry, namely, cement, cement blocks, concrete, brick, mortar, tile and the like; stone; metal including aluminum and steel; plaster board and wood and, in addition, certain magic marker stains and high gloss hard enamel surfaces; (3) a paint and graffiti remover composition that is particularly adapted to remove extra heavy graffiti along with all underlying paint or paint alone from all non-plastic surfaces, such as steel structures, namely, bridges, buildings, highway underpasses and overpasses, statues, walls and the like, as well as equipment and machinery; (4) two plexiglass graffiti compositions that are particularly adapted to remove graffiti from coated polycarbonate, methyacrylate, methyl methacrylate, polyvinyl chloride compounds (hard vinyl compounds), melamine plastics, acrylic, plexiglass and glass surfaces; and (5) a vinyl graffiti composition that is adapted to remove graffiti from all soft vinyl surfaces.

Each of the five cleaner compositions includes among its ingredients four certain active or main ingredients, a thickening agent and a surfactant. The four active ingredients include: N-methylpyrrolidone, propylene carbonate, dipropylene glycol methyl ether acetate or dipropylene glycol monomethyl ether acetate and isocetyl alcohol. The thickening agent preferably is a hydroxypropyl cellulose, and the surfactant preferably is a nonyl phenol. It is anticipated, although not necessary, that all cleaner compositions may include an odor abatement additive. In order to have the cleaner composition be effective for the variety of surfaces that have graffiti thereon, the range of each active ingredient and, at times, the range of the additives in each composition varies amongst the compositions. Moreover, each composition has a different combination of additional ingredients. For example, in the general graffiti cleaner, heavy duty graffiti cleaner and remover compositions that are used for non-plastic surfaces, dimethyl sulfoxide is an ingredient. In one of the plexiglass compositions, a tertiary amine is an additional ingredient. In the preferred composition for cleaning vinyl, certain oils are needed to prevent erosion, melting or color removal of soft vinyl by the solvents in the composition.

N-methylpyrrolidone or N-methyl-2-pyrrocidone is an active ingredient in the present cleaner compositions. The N-methylpyrrolidone is a solvent with a very low evaporation rate (above 210 degrees Fahrenheit) and is a water soluble material that acts to promote the action of cleaning in concert with the other three active ingredients. The N-methylpyrrolidone has been found to have excellent paint remover properties. A preferred N-methylpyrrolidone is sold under the trademark M Pyrol by GAF.

Propylene carbonate, which has a generic name of dioxolanone, is the second active ingredient. It also is a solvent. A preferred propylene carbonate is sold under the tradename Arconate 1000 by Arco Chemical Company of Newtown Square, Pa. It also has paint removing properties, but is not as effective a paint remover as the N-methylpyrrolidone.

A glycol material is the third active ingredient. The glycol material is also a solvent. The glycol material should be selected from the aliphatic ether ester family. The preferred glycol, which has a generic name glycol ether ester, is dipropylene glycol methyl ether acetate or dipropylene glycol monomethyl ether acetate.

(Ether instead of ether acetate can be used, however ether evaporates at room temperature too quickly to be efficient and makes the surface coat brittle).

The dipropylene glycol methyl ether acetate or dipropylene glycol monomethyl ether acetate with the additives readily disperses both the N-methylpyrrolidone and the propylene carbonate in solution. This ingredient is believed to make the N-methylpyrrolidone more efficient. The dipropylene glycol methyl ether acetate or dipropylene glycol monomethyl ether acetate is less effective than N-methylpyrrolidone and propylene carbonate in removing paint graffiti from a surface. However, in concert with the N-methylpyrrolidone and propylene carbonate, it is believed to have a synergistic effect. Further, it has the advantage of having a very high boiling point and an exceedingly low evaporation rate.

Two other glycol materials, namely dipropylene glycol ethyl ether acetate and dipropylene glycol monoethyl ether acetate ("ethyls") can be used in these cleaner compositions. However, the ethyls are chemicals that are now listed in U.S. government regulations as toxic. Accordingly, it is preferred not to include the "ethyls" in the preferred cleaner compositions.

Isocetyl alcohol is the fourth active ingredient in the present cleaner composition. It is also a low evaporative type solvent. Isocetyl alcohol, which has the chemical name iso hexadecanol, is from the aliphatic alcohols-branched dimer type chemical family. Isocetyl alcohol is a synthetic and is particularly useful in cleaning certain surfaces, such as, for example, polyvinyl chloride compounds, soft vinyl, plastic, polycarbonate, acrylic, plexiglass and glass surfaces upon which the cleaner composition is applied. It is used in the present composition particularly because it dissolves inks and marking pen mark or dye type graffiti on all surfaces.

The preferred aliphatic alcohol-branched dimer isocetyl alcohol has a low order of toxicity. The isocetyl alcohol has a vapor pressure less than 1 mmHg at 68 degree F., a viscosity of 180 CST at 68 degrees F., a freezing/melting point of −60 degrees F., a boiling point of 518 to 572 degrees F. and a specific gravity of vapor greater than 5.0 when measured that at one atmosphere air equals one.

A certain two additives should be included in each cleaner composition to provide preferred results. These additives act to improve the effectiveness of each cleaner composition. The additives are non-toxic materials. The two additives are a thickening agent and a surfactant.

The thickening agent is used to insure that the cleaner composition is kept on the surface to be treated when the surface is sloping or vertical, or when it is the underside of a horizontal surface. Basically, the thickening agent makes certain that the surface retains the cleaner. As used in all compositions of the present invention, the thickening agent is a dry powder that is added into the otherwise liquid solution that forms each composition.

The preferred thickening agent is a hydroxypropyl cellulose thickening agent. The chemical or common name of this thickening agent is cellulose, 2-hydroxpropyl ether or hydroxypropyl ether of cellulose. This preferred thickening agent is commonly sold under the name Klucel, and is made available by Aqualon Company.

This particular thickening agent is preferred because it is compatible with the active ingredients. Specifically, it has found to have excellent solubility with the active ingredients. However, the thickening agent has been found to solidify if above the recited range, while it turns into a watery substance if below the recited range. In either event, the thickening agent loses its effectiveness.

The second proprietary additive is a surfactant. The surfactant turns the composition from a chemical phase to a water phase so to be water soluble. The preferred surfactant is basically a non-ionic, ethoxylated nonyl phenol, that is chemical known as poly(oxy-1,2-ethanediyl)-alpha(nonylphenyl)omega-hydroxy. This surfactant has a specific gravity of 1.06 (water equals one) and a vapor pressure of less than 1 mm Hg at 20 degrees Centigrade. It is also soluble in water at 25 degrees Centigrade.

This preferred surfactant is sold under the name Witconol NP-100 by Witco Company. This preferred surfactant, Witconol NP-100 or poly(oxy-1,2-ethanediyl)-alpha(nonylphenyl)omega-hydroxy, has been found to lose or diminish its water affinity properties should the amount of the surfactant be below a certain percent. An alternative surfactant is sold under the name Tritan N-100 or x-100 by Rohm & Haas Co.

Each of the cleaner compositions may include a trace amount of an odor abatement ingredient or additive. The odor abatement ingredient can be anything to abate or remove the slight odor of the product, provided the ingredient is compatible with the other ingredients of the cleaner compositions. It has been found that orange oil or lavender oil are preferred. A trace amount means about 0.01 liters in each preferred cleaner composition.

As stated before, each specie cleaner composition includes other ingredients. For example, the general graffiti, heavy duty graffiti and stripper cleaner compositions of the present invention also include dimethyl sulfoxide.

Dimethyl sulfoxide is a strong solvent. It also is a penetrating agent that is used to penetrate the graffiti. Accordingly, dimethyl sulfoxide is used in varying and increasing proportions in the general graffiti, heavy duty graffiti and paint remover or emulsifier cleaner compositions to optimize the effectiveness of each composition on the recommended surfaces by penetrating the surface and piggy-backing the other components or ingredients to remove graffiti from such porous surfaces. This penetrability is needed to clean most surfaces, except plastic type and soft vinyl surfaces. Thus, this ingredient is not used in the plexiglass and vinyl composition.

There are two plexiglass cleaner compositions. Neither composition includes dimethyl sulfoxide. One of the two plexiglass cleaner compositions includes a tertiary amine. The preferred tertiary amine is a modified aliphatic polyamine and it is sold under the name Ancamine K54 by Pacific Anchor Chemical Co.

The vinyl cleaner composition does not include either the dimethyl sulfoxide or the tertiary amine, but does include mineral oil and lavender oil. These oils in combination with the other ingredients of the vinyl composition make the vinyl cleaner composition particularly effective for soft vinyl surfaces and preserves the texture and pliability of the vinyl. The grade of the mineral oil is preferably PD-23 from Witco Corporation.

Referring now to each cleaner composition, the first composition is a general graffiti composition. It is used to remove graffiti from coated or non-porous surfaces, such as, for example, baked or high gloss enamel, polished or glazed surfaces, masonry, namely, cement and concrete, brick, tile and the like; stone and polished stone; metals including aluminum and steel; smooth or polished wood.

This general graffiti composition includes N-methylpyrrolidone in an amount between about 32 to about 40 percent, propylene carbonate in an amount between about 15 to about 25 percent, dipropylene glycol methyl ether acetate or dipropylene glycol monomethyl ether acetate in an amount between about 15 to about 25 percent and isocetyl alcohol in an amount between about 15 to about 25 percent. The general graffiti composition also includes dimethyl sulfoxide in an amount between about 4 to about 8 percent, a thickening agent, preferably cellulose, 2-hydroxpropyl ether or hydroxypropyl ether of cellulose, in an amount between about 2 to about 3 percent and a surfactant, preferably poly-(oxy-1,2-ethanediyl)-alpha(nonylphenyl)omega-hydroxy known as Witconol NP-100, in an amount between about 1 to about 3 percent, by volume of the total composition.

Use of N-methylpyrrolidone above 40 percent has been found to be expensive and often uncompetitive in the market place, while below 32 percent it does not provide the favorable results achieved within the range. Use of propylene carbonate below 15 percent and above 25 percent is not as effective as in the recited range because it acts too slowly in solution. Use of the dipropylene glycol methyl ether acetate or the dipropylene glycol monomethyl ether acetate above 25 percent reduces the effectiveness of the other active ingredients and can attack the substrate in certain circumstances.

The following is the preferred general graffiti composition both in percent by volume and in liters. The total batch consists of about 38 to 40 liters.

| Ingredient | Amount (% by volume) | Liters |
| --- | --- | --- |
| N-methylpyrrolidone | 35 | 13.3 |
| Propylene carbonate | 18 to 20 | 7.0 to 7.6 |
| Dipropylene glycol methyl ether acetate or dipropylene glycol monomethyl ether acetate | 18 to 20 | 7.0 to 7.6 |
| Isocetyl Alcohol | 19 to 20 | 7.4 to 7.6 |
| Dimethyl sulfoxide | 5 | 1.9 |
| Hydroxypropyl cellulose thickening agent | 2.5 | 1.1 |
| Nonyl phenol surfactant | 2.0 | 0.76 |

The present general graffiti composition differs from the general graffiti composition in the priority application cited above in that the new composition includes dimethyl sulfoxide as an additional penetrating agent. Further, the range of propylene carbonate varies in the two compositions. It has been found that the present general graffiti composition is an improvement over the previous or priority general graffiti composition in that it has an improved ability, especially from the standpoint of effectiveness and time, to remove all types of graffiti on all surfaces except plastic.

The method of mixing or blending the ingredients for the present general graffiti composition is important. First, the isocetyl alcohol and N-methylpyrrolidone are blended together by using normal agitation for about three to about five minutes. Simultaneously or thereafter, the propylene carbonate and dipropylene glycol methyl ether acetate are also blended together again using normal agitation for about three to about five minutes. Then, the combination of propylene carbonate and dipropylene glycol methyl ether acetate are blended into the combination of isocetyl alcohol and N-methylpyrrolidone by pouring the propylene carbonate-dipropylene glycol methyl ether blend into the isocetyl alcohol-N-methylpyrrolidone blend. Specifically, one-third or one of three equal parts of the propylene carbonate-dipropylene glycol methyl ether blend is blended into the isoetyl-N-methylpyrrolidone blend with approximately one minute agitation before adding the next part.

The dimethyl sulfoxide can be added either to the propylene carbonate-dipropylene glycol methyl ether acetate when they are being blended together or after all four active ingredients have been blended together.

The hydroxypropyl cellulose thickening agent is then slowly added to the mixture with high agitation for about ten minutes. Thereafter, the nonyl phenol surfactant is blended into the mixture with high agitation for a few minutes. The odor abatement additive is then blended into the mixture if one is used.

The second composition is a heavy duty graffiti composition that is used to remove a large number of layers of graffiti and the underlying paint from uncoated or porous surfaces, such as, for example, masonry, namely, cement, cement blocks, concrete, brick, mortar, tile and the like; stone; metal including aluminum and steel; plaster board and wood and, in addition, certain magic marker stains and high gloss hard enamel surfaces. The heavy duty graffiti composition is used if the graffiti has been on the surface for several years and all of the solvents in the graffiti have evaporated from the graffiti. The heavy duty graffiti cleaner composition includes N-methylpyrrolidone in an amount between about 40 to about 60 percent, propylene carbonate in an amount between about 10 to about 20 percent, dipropylene glycol methyl ether acetate or dipropylene glycol monomethyl ether acetate in an amount between about 3 to about 7 percent and isocetyl alcohol in an amount between about 7.5 to about 14 percent. The heavy duty graffiti composition also includes dimethyl sulfoxide in an amount between about 7.5 to about 14 percent, the hydroxypropyl cellulose thickening agent in an amount between about 2.3 to about 3.5 percent and the nonyl phenol surfactant in an amount between about 1 to about 3 percent, by volume of the total composition.

More of the hydroxypropyl cellulose thickening agent is present in the heavy duty composition than in the general graffiti composition in order to breakdown the additional dimethyl sulfoxide found in this composition.

It is believed that the effectiveness of each ingredient in the heavy duty graffiti composition diminishes beyond its range for the same reasons as set forth above with respect to the general graffiti composition.

The following is a preferred heavy duty graffiti composition that is about 40.15 total liters.

| Ingredient | Amount (% by volume) | Liters |
| --- | --- | --- |
| N-methylpyrrolidone | 59.7 | 24.0 |
| Propylene carbonate | 14 to 15.2 | 5.6 to 6.1 |
| Dipropylene glycol methyl ether acetate or dipropylene glycol monomethyl ether acetate | 4 to 5.24 | 2.10 |
| Isocetyl Alcohol | 8 to 9.95 | 3.2 to 4 |
| Dimethyl sulfoxide | 8 to 9.95 | 3.2 to 4 |
| Hydroxypropyl cellulose thickening agent | 3.0 | 1.2 |

-continued

| Ingredient | Amount (% by volume) | Liters |
|---|---|---|
| Nonyl phenol surfactant | 2.0 | 0.80 |

The mixing or formulation of the heavy duty composition is the same as that for the general graffiti composition.

The third cleaner composition is an emulsifier composition that is used to remove graffiti and underlying paint from all surfaces except plastic. It has been initially found that this emulsifier or paint remover composition will destroy plastic and soft vinyl surfaces and, therefore, is not used on such surfaces. The paint remover composition includes N-methylpyrrolidone in an amount between about 40 to about 60 percent, propylene carbonate in an amount between about 5 to about 20 percent, dipropylene glycol methyl ether acetate or dipropylene glycol monomethyl ether acetate in an amount between about 2 to about 6 percent, isocetyl alcohol in an amount between about 7.5 to about 14 percent, dimethyl sulfoxide in an amount between about 10 to about 30 percent, the hydroxypropyl cellulose thickening agent in an amount between about 1 to about 3 percent and the nonyl phenol surfactant in an amount between about 1 to about 3 percent, by volume of the total composition.

The paint remover composition can also be used to clean or remove finish from furniture and metal surface. It emulsifies, and thus removes, the finish (and unwanted vanish, stains and paint) from the furniture and metal substrates. The furniture that can be treated is wood, metal and masonry furniture. The paint remover and heavy duty and general graffiti cleaner compositions are not, however, effective for plastics and fabric.

The following is the preferred paint remover composition that amounts to a total batch of about 40.05 liters.

| Ingredient | Amount (% by volume) | Liters |
|---|---|---|
| N-methylpyrrolidone | 59.0 to 60.0 | 22.8 to 23.6 |
| Propylene carbonate | 6.0 to 7.372 | 2.4 to 2.8 |
| Dipropylene glycol methyl ether acetate or dipropylene glycol monomethyl ether acetate | 2.13 to 2.63 | 0.85 to 1.0 |
| Isocetyl Alcohol | 9.0 to 10.0 | 3.60 to 3.8 |
| Dimethyl sulfoxide | 19.0 to 20.0 | 7.60 to 8.0 |
| Hydroxypropyl cellulose thickening agent | 3.0 | 1.2 |
| Nonyl phenol surfactant | 2.0 | 0.80 to 0.85 |

The fourth composition is a plexiglass graffiti composition that is used to remove graffiti from methyacrylate, methyl methacrylate, coated or scratch resistant polycarbonate, polyvinyl chloride compounds (hard vinyl compounds), melamine plastics, acrylic, plexiglass and glass surfaces. Due to the excessive softness and propensity of such surfaces to melt or fog when contacted by solvents, damage to the surface, such as distortion, melting and fogging, occurs with all heretofore known cleaners. Such damage cannot be corrected.

While the use of the general graffiti cleaner and the heavy duty graffiti cleaner and, of course, the paint remover or cleaner compositions on these surfaces will remove graffiti, they also may have some of the aforementioned deleterious effects. Accordingly, the present plexiglass cleaner compositions have been developed to provide the desired cleaning of graffiti but without the deleterious side effects. The present plexiglass cleaner compositions, by the addition of certain additives and the substantial reduction of the amount of the range of certain active ingredients, unexpectedly have been found to have even better results in overall performance that applicant's priority plexiglass cleaner composition discussed above.

It is believed that the present plexiglass cleaner compositions are also effective in removing graffiti from glass. Accordingly, it is believed that these compositions will be particularly effective in removing paint that inadvertently drops on a glass when one is painting a window frame.

Initial tests have indicated that the present plexiglass cleaner compositions and the earlier plexiglass cleaner composition, are not effective on soft vinyl and polystyrene surfaces probably because these surfaces cannot accept the chemical content of the plexiglass compositions. The coated polycarbonate, acrylic and plexiglass surfaces that have found to be particularly suited for the present plexiglass cleaner compositions are normally found in schools (coated polycarbonate, acrylic and plexiglass is required in many states to be used in first floor windows in school buildings), office buildings, rapid transit vehicles and car and bus passenger shelters and stations.

Both present plexiglass cleaner compositions include N-methylpyrrolidone in an amount between about 10 to about 20 percent, propylene carbonate in an amount between about 45 to about 55 percent, dipropylene glycol methyl ether acetate or dipropylene glycol monomethyl ether acetate in an amount between about 10 to about 20 percent, isocetyl alcohol in an amount between about 10 to about 20 percent, the hydroxypropyl cellulose thickening agent in an amount between about 1 to about 3 percent and the nonyl phenol surfactant in an amount between about 1 to about 3 percent. In one of the present plexiglass cleaner compositions, a tertiary amine in an amount up to 1.4 percent by volume of the total composition is also included.

It is believed that if the N-methylpyrrolidone is above 20 percent, the cleaned surface is attacked, i.e. fogging occurs. Also, if the N-methylpyrrolidone is below 10 percent, it is ineffective and can separate out from the cleaner composition.

It is also believed that if the propylene carbonate is outside the above range, the cleaner composition may also attack the surface so that the surface will distort and fog. Also, if the propylene carbonate is below 45 percent, the composition loses its effectiveness.

The isocetyl alcohol can separate out from the plexiglass cleaner composition above 20 percent. Below 10 percent, the isocetyl alcohol is ineffective in removing inks contained in markers.

As with the isocetyl alcohol, the dipropylene glycol methyl ether acetate fogs or damages the cleaned surface when it is above 20 percent and is ineffective in the cleaner composition below 10 percent.

The following is the preferred plexiglass cleaner composition that is believed to be extremely effective on acrylic and some coated polycarbonate surfaces.

| Ingredient | Amount (% by volume) | Liters |
|---|---|---|
| N-methylpyrrolidone | 14.4 | 5.53 |
| Propylene carbonate | 52.3 | 20.07 |

-continued

| Ingredient | Amount (% by volume) | Liters |
|---|---|---|
| Dipropylene glycol methyl ether acetate or dipropylene glycol monomethyl ether acetate | 14.4 | 6.69 |
| Isocetyl Alcohol | 14 to 14.4 | 5.53 |
| Hydroxypropyl cellulose thickening agent | 2.6 | 1.00 |
| Nonyl phenol surfactant | 1.3 | 0.535 |
| Tertiary amine | up to 1.4 | up to 0.551 |

The total batch is about 39.355 to about 39.906 liters.

Without tertiary amine, the plexiglass composition will fog the acrylic and some coated polycarbonate.

However, it has been found that the plexiglass composition without the tertiary amine is more effective in removing stains on hard polyvinyl chloride compounds on metal surfaces than the plexiglass composition with the tertiary amine. It has also been found that the plexiglass composition without the tertiary amine cleans melanime plastic without leaving any shadows. The following is the preferred plexiglass composition without the tertiary amine.

| Ingredient | Amount (% by volume) | Liters |
|---|---|---|
| N-methylpyrrolidone | 14.4 | 5.53 |
| Propylene carbonate | 52.3 | 20.07 |
| Dipropylene glycol methyl ether acetate or dipropylene glycol monomethyl ether acetate | 15.4 to 17.4 | 6.0 to 6.69 |
| Isocetyl Alcohol | 14.4 | 5.53 |
| Hydroxypropyl cellulose thickening agent | 2.6 | 1.00 |
| Nonyl phenol surfactant | 1.3 | 0.535 |

The total batch is between about 38.78 to 39.355 liters.

The present plexiglass cleaner composition differ from the plexiglass formula found in the priority application cited above for the following reasons. The substantial reduction of the N-methylpyrrolidone in the present plexiglass compositions has been found to avoid etching that occurs when there is a delay in removing the composition from the surface. The use of the surfactant in the present compositions has been found beneficial to insure that no residue of composition remains after the cleaner is removed from the surface. The thickening agent now found in the present compositions allows the formulation to remain on a vertical surface longer. The increase of the dipropylene glycol methyl ether acetate in the present compositions reduce the etching effect of N-mythylpyrrolidone. It has also now been found to be important that ether and diethylene should not be used in a plexiglass cleaner composition. Ether should not be used due to its evaporation rate, while diethylene should not be used since it is now listed as toxic in present U.S. government regulations.

To formulate the plexiglass compositions, you blend the isocetyl alcohol and N-methylpyrrolidone together and the propylene carbonate and dipropylene glycol methyl ether acetate together in the same manner and sequence as in the general graffiti composition. If the tertiary amine is included, it is blended in at the time the isocetyl alcohol and N-methylpyrrolidone are being blended together. Unlike the general graffiti, heavy duty graffiti and stripper compositions, the first or isocetyl alcohol-N-methylpyrrolidone blend is blended, in three equal parts, into the second or propylene carbonate-dipropylene glycol methyl ether acetate blend in the plexiglass composition, instead of the second blend being blended into the first blend.

The fifth composition is a vinyl cleaner composition that is used to remove graffiti from all soft vinyl surfaces, such as seat covers, cushions and padded surfaces. This cleaner composition is particularly suited for soft vinyl surfaces. The majority of graffiti on a soft vinyl surface is from marking pens. The oils in combination with the other ingredients in this composition makes the composition particularly suited for removing such graffiti on soft vinyl surfaces.

The vinyl composition is a two part composition. The first part of this composition is between about 70 and about 80 percent by volume of the total composition. The second part is between about 20 and about 30 percent by volume of the total composition.

The first part includes N-methylpyrrolidone in an amount between about 10 to about 14 percent, propylene carbonate in an amount between about 50 to about 60 percent, dipropylene glycol methyl ether acetate or dipropylene glycol monomethyg ether acetate in an amount between about 10 to about 15 percent and isocetyl alcohol in an amount between about 10 to about 18 percent. The vinyl composition also includes the hydroxypropyl cellulose thickening agent in an amount between about 1 to about 2 percent and the nonyl phenol surfactant in an amount between about 0.5 to about 1.5 percent, by volume of the total composition.

The second part of the vinyl cleaner composition includes lavender oil and mineral oil. A minor amount of lavender oil has been found to make the mineral oil work effectively in preventing any drying out of the vinyl or loss of vinyl color from the vinyl itself or any melting or damage to the vinyl substrate or surface under the graffiti.

The following is the preferred first part of the vinyl composition that makes up seventy-six percent of the total vinyl composition.

| Ingredient | Amount (% by volume) | Liters |
|---|---|---|
| N-methylpyrrolidone | 14 | 30 |
| Propylene carbonate | 58.4 | 125 |
| Dipropylene glycol methyl ether acetate or dipropylene glycol monomethyl ether acetate | 11.6 | 25 |
| Isocetyl Alcohol | 14 | 30 |
| Hydroxypropyl cellulose thickening agent | 1 | 2 |
| Nonyl phenol surfactant | 1 | 2 |

The oils or second part of the composition preferably are about twenty four percent of the total preferred vinyl composition. The preferred second part of the vinyl cleaner composition includes about 1 liter of lavender oil and about 74 liters of mineral oil.

To formulate the vinyl composition, you mix the ingredients of the first part in the manner set forth above with respect to the plexiglass cleaner composition. Then, the oils are blended together and subsequently added to the blended first part.

It has been found that the above stated method of formulating each cleaner composition protects against the ingredients separating out of the various compositions, i.e. each composition remains stable, except the oils separate but quickly remixes on agitation.

All of the cleaner compositions are water soluble, have a pale yellow appearance and a somewhat fruity fragrance. Moreover, each cleaner composition is non-flammable. Due to the cleaner compositions' water solubility, all of the cleaner compositions except vinyl can also be rinsed or washed off with water to simultaneously neutralize the cleaner compositions. In the vinyl cleaner composition, water neutralizes the solvent part of the composition and leaves the oil part of the composition, as a film, on the vinyl surface to protect the vinyl surface.

Each cleaner composition may be applied to the appropriate surface by the use of one or more of the following means, namely roller, brush, foam spray under pressure in an aerosol type can or a soft cloth. It has been found that the general graffiti cleaner, heavy duty graffiti cleaner and paint remover compositions are, preferably, applied by roller, brush, foam spray or soft cloth. The plexiglass and vinyl compositions are, preferably, applied by soft cloth or spray.

A particularly preferred means of application for the general graffiti and heavy duty graffiti cleaners and the paint remover compositions is by the use of a foam sprayer since it permits a simpler, easier and faster and more accurate application. It is particularly preferred for small surface areas to be cleaned. Specifically, the cleaner is sprayed on in a direct, controllable stream-like bead and, immediately thereafter, is gently massaged on the surface to be treated with a very soft cloth or a brush for the general graffiti and heavy duty graffiti cleaner compositions and the paint remover or emulsifier cleaner composition. It is cleaned off by water spray or damp cloth. The cloth should be made of a soft material, such as flannel, soft cotton, cheese cloth or velvet type toweling, to assure that the cloth is absorbent and does not scratch the treated surface. Obviously, the cloth must be free of grit or grime in order to also avoid scratching of the surface.

Repeated applications of the cleaner are suggested when there are extra heavy layers or very old graffiti on the surface. The repeated applications will not have any deleterious effects on the treated surface.

In order to be used as a foam spray, the cleaner needs a propellant. The preferred propellant is carbon dioxide since it is non-flammable. To the above cleaner composition, the propellant is added in amount such that the propellant constitutes about two (2) to about four (4) percent by volume of the resultant foam spray composition.

One gallon of cleaner will typically cover about four hundred square feet of relatively heavily graffitied surface area although this will vary greatly as a function of the thickness and type of graffiti on the surface.

Having thus described the invention with particular reference to the preferred forms thereof, it will be obvious that various changes and modifications may be made therein without departing from the spirit and scope of the invention as defined by the appended claims.

Wherefore, I claim:

1. A base composition for removing graffiti from a surface comprising in percentage by volume of the composition:
   (a) N-methylpyrrolidone in an amount between about 10 and about 60 percent;
   (b) propylene carbonate in an amount between about 5 and about 60 percent;
   (c) an ingredient selected from the group consisting of dipropylene glycol methyl ether acetate and dipropylene glycol monomethyl ether acetate in an amount between about 2 and about 25 percent;
   (d) isocetyl alcohol in an amount between about 7.5 and about 25 percent;
   (e) hydroxypropyl cellulose in an amount between about 1.0 and about 3.5 percent;
   (f) an ethoxylated nonyl phenol surfactant in an amount between about 0.5 and about 3.0 percent; and
   (g) dimethyl sulfoxide in an amount between about 4 percent and about 30 percent by volume of the composition.

2. A base composition for removing graffiti from a surface comprising in percentage by volume of the composition:
   (a) N-methylpyrrolidone in an amount between about 10 and about 60 percent;
   (b) propylene carbonate in an amount between about 5 and about 60 percent;
   (c) an ingredient selected from the group consisting of dipropylene glycol methyl ether acetate and dipropylene glycol monomethyl ether acetate in an amount between about 2 and about 25 percent;
   (d) isocetyl alcohol in an amount between about 7.5 and about 25 percent;
   (e) hydroxypropyl cellulose in an amount between about 1.0 and about 3.5 percent;
   (f) an ethoxylated nonyl phenol surfactant in an amount between about 0.5 and about 3.0 percent; and
   (g) a modified aliphatic polyamine as a tertiary amine.

3. A composition for removing graffiti from a coated or non-porous surface, the composition comprising in percentage by volume of the composition:
   (a) N-methylpyrrolidone in an amount between about 32 and about 40 percent;
   (b) propylene carbonate in an amount between about 15 and about 25 percent;
   (c) an ingredient selected from the group consisting of dipropylene glycol methyl ether acetate and dipropylene glycol monomethyl ether acetate in an amount between about 15 and about 25 percent;
   (d) isocetyl alcohol in an amount between about 15 and about 25 percent;
   (e) dimethyl sulfoxide in an amount between about 4 and about 8 percent;
   (f) hydroxypropyl cellulose in an amount between about 2 and about 3 percent; and
   (g) an ethoxylated nonyl phenol surfactant in an amount between about 0.5 and about 3.0 percent.

4. The composition of claim 3, wherein the ingredient is dipropylene glycol methyl ether acetate.

5. The composition of claim 3, wherein the N-methylpyrrolidone is present in an amount about 35 percent, the propylene carbonate is present in an amount about 20 percent, the ingredient is present in an amount about 20 percent, the isocetyl alcohol is present in an amount about 20 percent, and the dimethyl sulfoxide is present in an amount about 5 percent, by volume of the composition.

6. A composition for removing graffiti and all underlying paint from all non-plastic surfaces, equipment and machinery, the composition comprising in percentage by volume of the composition:
   (a) N-methylpyrrolidone in an amount between about 40 and about 60 percent;

(b) propylene carbonate in an amount between about 5 and about 20 percent;

(c) an ingredient selected from the group consisting of dipropylene glycol methyl ether acetate and dipropylene glycol monomethyl ether acetate in an amount between about 2 and about 6 percent;

(d) isocetyl alcohol in an amount between about 7.5 and about 14 percent;

(e) dimethyl sulfoxide in an amount between about 10 to about 30 percent;

(f) hydroxypropyl cellulose in an amount between about 1.0 and about 3.0 percent; and (g) an ethoxylated nonyl phenol surfactant in an amount between about 1.0 and about 3.0 percent.

7. The composition of claim 6, wherein the ingredient is dipropylene glycol methyl ether acetate.

8. The composition of claim 6, wherein the N-methylpyrrolidone is present in an amount between about 59.5 and about 60 percent, the propylene carbonate is present in an amount between about 6.87 and about 7.37 percent, the ingredient is present in an amount about 2.63 percent, the isocetyl alcohol is present in an amount between about 9.5 and about 10 percent, and the dimethyl sulfoxide is present in an amount between about 19 and about 20 percent, by volume of the first part of the composition.

9. A composition for removing graffiti from a surface of coated polycarbonate, methycrylate, methyl methacrylate, hard polyvinyl chloride compounds, acrylic, plexiglass, glass, melamine plastics or a combination thereof, the composition comprising in percentage by volume of the composition:

(a) N-methylpyrrolidone in an amount between about 16 and about 22 percent;

(b) propylene carbonate in an amount between about 45 and about 55 percent;

(c) an ingredient selected from the group consisting of dipropylene glycol methyl ether acetate and dipropylene glycol monomethyl ether acetate in an amount between about 12 and about 20 percent, wherein the ingredient is dipropylene glycol methyl ether acetate;

(d) isocetyl alcohol in an amount between about 16 and about 22 percent;

(e) hydroxypropyl cellulose in an amount between about 1.0 and about 3.0 percent; and (g) an ethoxylated nonyl phenol surfactant in an amount between about 1.0 and about 3.0 percent.

10. A composition for removing graffiti from a surface of coated polycarbonate, methyacrylate, methyl methacrylate, hard polyvinyl chloride compounds, acrylic, plexiglass, glass, melamine plastics or a combination thereof, the composition comprising in percentage by volume of the composition:

(a) N-methylpyrrolidone in an amount between about 16 and about 22 percent;

(b) propylene carbonate in an amount between about 45 and about 55 percent;

(c) an ingredient selected from the group consisting of dipropylene glycol methyl ether acetate and dipropylene glycol monomethyl ether acetate in an amount between about 12 and about 20 percent;

(d) isocetyl alcohol in an amount between about 16 and about 22 percent;

(e) hydroxypropyl cellulose in an amount between about 1.0 and about 3.0 percent;

(g) an ethoxylated nonyl phenol surfactant in an amount between about 1.0 and about 3.0 percent; and (h) a modified aliphatic polyamine as a tertiary amine.

11. The composition of claim 10, wherein the N-methylpyrrolidone is present in an amount about 14.4 percent, the propylene carbonate is present in an amount about 52.3 percent, the ingredient is present in an amount about 14.4 percent, and the isocetyl alcohol is present in an amount about 14.4 percent, by volume of the composition.

12. A composition for removing graffiti from a surface of coated polycarbonate, methyacrylate, methyl methacrylate, hard polyvinyl chloride compounds, acrylic, plexiglass, glass, melamine plastics or a combination thereof, the composition comprising in percentage by volume of the composition:

(a) N-methylpyrrolidone in an amount between about 16 and about 22 percent;

(b) propylene carbonate in an amount between about 45 and about 55 percent;

(c) an ingredient selected from the group consisting of dipropylene glycol methyl ether acetate and dipropylene glycol monomethyl ether acetate in an amount between about 12 and about 20 percent;

(d) isocetyl alcohol in an amount between about 16 and about 22 percent;

(e) hydroxypropyl cellulose in an amount between about 1.0 and about 3.0 percent; and (g) an ethoxylated nonyl phenol surfactant in an amount between about 1.0 and about 3.0 percent, wherein the N-methylpyrrolidone is present in an amount about 14.4 percent, the propylene carbonate is present in an amount about 52.3 percent, the ingredient is present in an amount about 17.4 percent, and the isocetyl alcohol is present in an amount about 14.4 percent, by volume of the composition.

13. A composition for removing graffiti from soft vinyl surfaces, the composition comprising in percentage by volume of the composition:

a first part that includes:

(a) N-methylpyrrolidone in an amount between about 10 and about 14 percent;

(b) propylene carbonate in an amount between about 50 and about 60 percent;

(c) an ingredient selected from the group consisting of dipropylene glycol methyl ether acetate and dipropylene glycol monomethyl ether acetate in an amount between about 10 and about 15 percent;

(d) isocetyl alcohol in an amount between about 10 and about 18 percent;

(e) hydroxypropyl cellulose in an amount between about 1.0 and about 2.0 percent; and (g) an ethoxylated nonyl phenol surfactant in an amount between about 0.5 and about 1.5 percent; and a second part that includes mineral oil and lavender oil.

14. The composition of claim 12, wherein the ingredient is dipropylene glycol methyl ether acetate.

15. The composition of claim 12, wherein the N-methylpyrrolidone is present in an amount about 14 percent, the propylene carbonate is present in an amount about 58.4 percent, the ingredient is present in an amount about 11.6 percent, and the isocetyl alcohol is present in an amount about 14 percent, by volume of the first part of the composition.

16. A composition for removing layers of graffiti and underlying paint from a non-coated or porous surface, the composition comprising in percentage by volume of the composition:
- (a) N-methylpyrrolidone in an amount between about 40 and about 60 percent;
- (b) propylene carbonate in an amount between about 10 and about 20 percent;
- (c) an ingredient selected from the group consisting of dipropylene glycol methyl ether acetate and dipropylene glycol monomethyl ether acetate in an amount between about 3 and about 7 percent;
- (d) isocetyl alcohol in an amount between about 7.5 and about 14 percent;
- (e) dimethyl sulfoxide in an amount between about 7.5 and about 14 percent;
- (f) hydroxypropyl cellulose in an amount between about 2.5 and about 3.5 percent; and
- (g) an ethoxylated nonyl phenol surfactant in an amount between about 1.0 and about 3.0 percent.

17. The composition of claim 16, wherein the ingredient is dipropylene glycol methyl ether acetate.

18. The composition of claim 16, wherein the N-methylpyrrolidone ie present in an amount about 59.7 percent, the propylene carbonate is present in an amount about 15.2 percent, the ingredient is present in an amount about 5.24 percent, the isocetyl alcohol is present in an amount about 9.95 percent, and the dimethyl sulfoxide is present in an amount about 9.95 percent, by volume of the composition.

* * * * *